United States Patent Office 3,743,526
Patented July 3, 1973

3,743,526
DRY PIGMENT PREPARATIONS AND PROCESS
FOR THEIR MANUFACTURE
Guenther Zwahlen, Dornach, Switzerland, assignor to
Ciba-Geigy AG, Basel, Switzerland
No Drawing. Continuation of application Ser. No.
832,005, June 10, 1969. This application Jan. 26,
1972, Ser. No. 221,085
Claims priority, application Switzerland, June 14, 1968,
8,834/68
Int. Cl. C08b 27/04, 27/14; C08f 45/02
U.S. Cl. 106—193 R                    8 Claims

ABSTRACT OF THE DISCLOSURE

Preparations containing at least one water-insoluble dyestuff and/or at least one optical brightener and at least one polyhydroxylated organic compound esterified with at least one polybasic inorganic acid, especially a cellulose sulfuric acid ester, are useful for pigmenting aqueous solutions.

---

This is a continuation of application Ser. No. 832,005, filed June 10, 1969, now abandoned.

It has been proposed that in order to manufacture dyed structures, especially fibres and films, of regenerated cellulose, finely divided colour pigments can be added, for example, to the viscose or cuprammonium cellulose spinning solution. A particular difficulty when using pigments is that the latter have to be extremely finely divided in the cellulose solution in order to achieve trouble-free spinning and uniform dyeing of the spun product. If the degree of distribution in the spinning solution is not sufficiently fine, changes in the colour shade can occur during the spinning process, since on filtration of the spinning solution a part of the colour pigment is retained directly before the spinneret. It may furthermore be necessary to change the filter relatively frequently and additionally it is frequently difficult, when using the pigment dyeing process, to achieve transparent dyeings, especially if high dyestuff concentrations are used.

The present invention is based on the observation that excellent fine-distribution of the pigments in the spinning solution can be achieved if the process is carried out in the presence of a polyhydroxylated organic compound which is esterified with a polybasic inorganic acid and optionally additionally with an organic acid.

The organic compound mentioned may be directly added to the cellulose spinning solution. In most cases it is however advantageous to use a pigment preparation in a liquid or solid form, which contains the pigment and the ester mentioned, and optionally one or more further additives, as an intimate mixture. In this case it does not matter whether the mineral acid ester or esters are, for example, only added to an aqueous pigment dispersion after fine grinding or whether they are already added before or during the fine grinding. The lastmentioned procedure will as a rule be preferred since the mineral acid esters according to the invention show a pronounced dispersing action. At the same time it is also an advantage of the mineral acid esters according to the invention over most dispersing agents that they show substantially no foaming.

The present invention also provides preparations containing at least one water-insoluble dyestuff and/or at least one optical brightener and at least one polyhydroxylated organic compound esterified with at least one polybasic inorganic acid.

Possible pigments for the preparations according to the invention are, for example, inorganic pigments, for example, carbon black, metal powders, titanium dioxide, hydrated iron oxides and ultramarine, but especially organic pigments for example those from the class of the azo, anthraquinone, phthalocyanine, nitro, perinone, perylene-tetracarboxylic acid diimide, dioxazine, thioindigo or quinacridone dyestuffs, and also optical brighteners possessing pigment character. It is also possible to use mixtures of different pigments or mixtures of pigments with optical brighteners.

Instead of the pigments, other water-insoluble dyestuffs, for example, dispersion dyestuffs, can also be used.

Possibile polyhydroxylated organic compounds on which the esters to be used according to the invention are based are especially cellulose. Additionally, other carbohydrates, for example, starch, semi-celluloses, glucosamines, glucosides, as well as sugars may also further be mentioned. As examples of sugars, monosaccharides, for example, glucose or fructose, or disaccharides, such as lactose, maltose, cellobiose or sucrose may be mentioned. As further polyhydroxylated compounds, polyalcohols, especially alcohols having at least 6 hydroxyl groups, for example mannitol or sorbitol, may be mentioned. Finally, polymers containing hydroxyl groups, for example polyvinyl alcohol, partially deacetylated polyvinyl acetate, or a deacetylated copolymer of vinyl acetate and vinyl chloride, may also be mentioned.

The polyhydroxyl compounds mentioned are esterified with a polybasic inorganic acid, especially with sulphuric acid. Additional possibiltes are however also, for example, the esters of phosphoric acid or of sulphurous acid.

The esters to be used according to the invention contain a free acid residue and can be employed as free acids or as water-soluble salts, for example as alkali metal, alkaline earth metal or ammonium salts or in the form of water-soluble salts of other metals or of organic bases, for example pyridine, morpholine, methylamine, ethylamine or ethanolamines. It is also possible to use mixtures of salts of different cations, or the free acid residue can also be esterified with the residue of a monohydric alcohol, for example in cellulose sulphuric acid methyl ester.

The polyhydroxyl compounds may also contain two or more acid residues which are different from one another, for example, two different inorganic acid residues, for example the residues of sulphuric acid and of phosphoric acid, or of sulphuric acid and of nitric acid, or of phosphoric acid and of nitric acid, and also the residues of a polybasic inorganic acid and of an organic acid, for example, the residues of sulphuric acid and of acetic acid, or of sulphuric acid, acetic acid and butyric acid.

It is also possible to use the esters of partially etherified polyhydroxyl compounds, for example, the sulphuric acid esters of methylcellulose, ethyl cellulose, hydroxyethylcellulose, hydroxypropylcellulose, hydroxyethylmethylcellulose, hydroxyethylcellulose, carboxymethylcellulose or benzylcellulose.

If the esters of cellulose are used, the latter can contain not more than 3, preferably 0.3 to 1, acid residues per glucose unit.

The quantity ratio of pigment to ester in the pigment preparations can vary within wide limits; it is however preferably within the range of from 9:1 to 1:4. The preparations may be in the form of a powder or of aqueous pastes. The latter offer the advantage over numerous other aqueous dyestuff preparations that they are frost-stable, that is to say that the quality of the aqueous preparation is not impaired by freezing and re-thawing.

In addition to the components to be used according to the invention, the preparations can further contain one or more other auxiliary materials for example, plasticizers, tensides, fungicides, stabilisers or fillers, or hydrotropically active additives, for example, urea or acetamide.

The pigment preparations can be manufactured according to various methods which are in themselves known, for example by merely mixing the components in the dry form or in an aqueous medium, by conjoint treatment in a high pressure homogenising machine, or by conjoint wet grinding of the components, for example in a sand mill or ball mill, or by kneading together in kneading apparatuses, for example of the Werner-Pfleiderer type, after which the resulting products can optionally still be converted into a dry form by evaporation, spray drying or freeze drying. The dry preparations thus obtained can be easily re-dispersed in water to an excellent degree of distribution. The dry preparation form is additionally more advantageous for transportation (for example, lower weight and absolute frost-resistance) and for storage (for example, less danger of attack by micro-organisms for example, fungi and no crust formation through drying-out).

For pigmenting regenerated cellulose, the preparations according to the invention are stirred into the cellulose spinning solution either in aqueous solution or directly in the powder form. In many cases it proves advantageous to manufacture a cellulose xanthate or cellulose cuprammoniate solution of high pigment concentration using the preparations, and to feed this solution to the spinning solution which is to be dyed.

Shaping takes place by spinning the dyed cellulose spinning solution into an acid precipitation bath according to the process known per se.

The post-treatment of the resulting structures also takes place according to conventional methods by washing with warm water, optionally also with a warm aqueous solution of an alkali sulphite or alkali sulphide for more rapid desulphurisation and subsequent rinsing and brightening by treatment with a wetting agent, preferably sodium oleate with warming.

The resulting dyeings are as a rule distinguished by high brilliance, transparency and excellent fastness to washing and abrasion. In addition to being suitable for the spin dyeing of the usual types of viscose the pigment preparations according to the invention are also suitable for the spin dyeing of high wet strength types of viscose, so-called polynosic types of viscose.

Other synthetic fibres spun from aqueous solutions can also be pigmented with the preparations according to the invention, for example polyvinyl alcohol or polyacrylonitrile fibres.

The preparations according to the invention can furthermore also be used for other aqueous application forms, for example for pigmenting paints which can be diluted with water, especially emulsion paints based on aqueous latices, or for the pigmenting of water colours. Their suitability for pigmenting aqueous lacquers for electrophoretic lacquering should also be mentioned.

A further field of use for the new pigment preparations is graphic printing inks. Thus they can, for example, be used for pigmenting printing inks capable of dilution with water, based on water-soluble binders, for example the pigmenting of wall paper printing inks, and also for the pigmenting of aqueous, aqueous-alcoholic or alcoholic printing inks for gravure printing, flexographic printing or screen printing, as, for example, used for the printing of paper.

A further field of application for the pigment preparations according to the invention, in the dry form or as aqueous pastes, is the bulk dyeing of paper, and of rubber latices as well as the pigmentation of leather coating colours.

The pigment preparations according to the invention are furthermore suitable for pigmenting printing inks or dye baths for pigment printing or pigment dyeing, respectively, of woven or knitted textile fabrics or of fleeces.

Finally, the pigment preparations according to the invention can also be used for pigmenting various further materials, for example cement, gypsum plaster, soaps, detergents, waxes, crayons, inks and India ink or cosmetic preparations.

If the dyestuff preparations according to the invention do not contain pigments but vat dyestuffs or dispersion dyestuffs as water-insoluble dyestuffs, then they can be used in the dry form or as aqueous pastes for dyeing or printing textile materials according to the various methods known for vat dyestuffs or dispersion dyestuffs respectively.

The following examples illustrate the invention: the parts, unless otherwise stated, denote parts by weight and the percentages denote percentages by weight.

Example 1

5 parts of Philblack O carbon black (Phillips Petroleum Co.), 5 parts of sodium cellulose sulphase containing an average of 0.7 sulphuric acid residues per glucose unit (manufactured according to Makromolekulare Chemie XII 1954, page 92) and 90 parts of water are ground at room temperature in a laboratory sand mill.

After reaching the desired degree of fineness (grinding time 4 hours) the ground material is separated from the sand and worked up by spray drying (exit air 80 to 90° C.) to give a loose powder comprising 50% of carbon black and 50% of the sodium salt of the cellulose sulphate.

10 parts of this preparation are stirred into 40 parts of water by means of a two-blade stirrer during one hour. A pigment dispersion of excellent fine-distribution is obtained.

Example 2

(a) 5 parts of Philblack O carbon black, 5 parts of sodium cellulose sulphate having a sulphate content of 0.5 (manufactured by reaction with butanol-sulphuric acid according to U.S. Pat. 2,559,914, Example 3) and 90 parts of water are ground in a laboratory sand mill at room temperature.

After reaching the desired degree of fineness (grinding time 4 hours) the ground material is separated from the sand and worked up by spray draying (exit air 80 to 90° C.) to give a loose powder comprising 50% of carbon black and 50% of the sodium salt of the cellulose sulphate.

10 parts of this preparation are stirred into 40 parts of water by means of a two-blade stirrer during 1 hour. A pigment dispersion of excellent fine-distribution is obtained.

(b) If in paragraph (a), the red azo dyestuff of the following structure

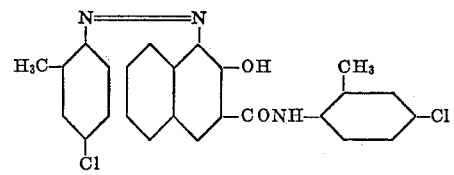

is used instead of carbon black, a red pigment preparation is obtained which can be dispersed in water by mere stirring in the same manner as the carbon black preparations.

(c) If in paragraph (a) the brown nitro dyestuff of the following structure

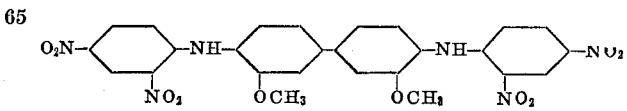

is used instead of carbon black, a brown preparation is obtained.

(d) If in paragraph (a) β-Cu-phthalocyanine is used instead of carbon black, a corresponding blue preparation is obtained.

Example 3

(a) 5 parts of the blue anthraquinone dyestuff of the following structure

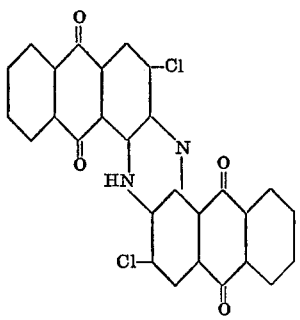

4 parts of sodium cellulose sulphate having an average esterification value of 0.5, 1 part of Tamol NNOK-SA (=anionic dispersing agent, condensation product of β-naphthalenesulphonic acid with formaldehyde, manufacturer: BASF) and 90 parts of water are ground in a laboratory sand mill in accordance with Example 2 and worked up.

A blue preparation is obtained which is, for example, suitable for vat dyeings and vat printing.

(b) If instead of the blue vat dyestuff the brown dispersion dyestuff of the following structure

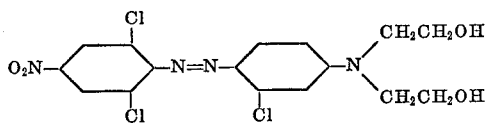

is used, a brown preparation is obtained which is for example suitable for dyeing and printing synthetic fibres.

Example 4

5 parts of Philblack O carbon black, 1.2 parts of sodium cellulose sulphate, DS=2.0[1]  
3.8 parts of sodium cellulose sulphate, DS=0.3[2]  } $\overline{DS}$ =0.75,

[1] Manufacture by treating 8 parts of cellulose in 125 parts of Pyridine and 50 parts of chlorosulphonic acid at 45° C. for 96 hours.
[2] Manufacture by treating 20 parts of cellulose in 74 parts of n-butanol and 186 parts of chemically pure sulphuric acid at 0° C. for 90 minutes.

and 90 parts of water are ground in a laboratory sand mill in accordance with Example 1 and worked up. A corresponding black preparation is obtained.

Example 5

(a) 20 parts of corn starch are stirred for 70 minutes at 0° C. in a mixture of 74 parts of n-butanol and 196 parts of chemically pure sulphuric acid. 100 parts of methanol are now added and the reaction mixture is subsequently filtered. The filter cake is washed with methanol and is then dissolved in 300 parts of distilled water and neutralised to pH 7.5 with sodium hydroxide solution. The resulting solution is dried by atomising. The product is a sodium starch sulphate with an average degree of esterification of 0.28.

(b) 5 parts of Philblack O carbon black, 4 parts of Nacorn starch sulphate according to Example 5(a), 1 part of Tamol NNOK-SA and 90 parts of water according to Example 1 are ground in a laboratory sand mill and worked up. A black preparation is obtained which is for example suitable for pigmenting aqueous emulsion paints (see Example 10).

Example 6

(a) 8 parts of ethylcellulose (Ethocel E7, Dow Chemical, with an average degree of etherification of about 2.5) are stirred for 24 hours at 55° C. in a mixture of 50 parts of chlorosulphonic acid and 125 parts of pyridine and then poured out onto 100 parts of ice and 500 parts of water. The resulting suspension is filtered, the filter cake is suspended in water and neutralised with sodium hydroxide solution to pH 7.3. A clear solution is obtained, from which the sodium-ethylcellulose sulphate is isolated by spray drying. The product has an average degree of esterification of about 0.45.

(b) 7 parts of β-Cu-phthalocyanine, 7 parts of sodium-ethylcellulose sulphate according to Example 6(a) and 86 parts of water are ground in a laboratory sand mill until the desired fineness is achieved and worked up in accordance with Example 1. A blue preparation is obtained which is for example suitable for pigmenting aqueous emulsion paints (see Example 10).

Example 7 (viscose)

1 part of the pigment preparation obtainable according to Example 1 is dissolved in 50 parts of water whilst stirring and stirred into 987 parts of ripened ready-to-spin viscose with a content corresponding to 75 parts of cellulose. Thereafter the viscose is spun into long fibres in the usual manner with the aid of a precipitation bath containing sulphuric acid. The fibres are subsequently washed in post-treatment baths (for example, water), desulphurised (for example, with dilute aqueous solutions of $Na_2S$ and NaOH), washed and brightened. The resulting fibres show a high colour strength, a pure shade, an excellent gloss and a fine uniform distribution of the pigment.

Instead of the preparation according to Example 1, the preparations according to Examples 2(a), 2(b), 2(c), 4 and 5 can be used with equally good success.

Example 8 (cellulose film)

The same pigmented viscose solutions as are used in Example 7 for the manufacture of fibres, can also successfully be processed into homogeneously coloured films.

Instead of employing the preparation in the dry form, it can be used in the form of an aqueous paste in accordance with the above process.

Example 9 (emulsion paints)

2 parts of the preparation obtained according to Example 1 are stirred into 98 parts of Eklasit A (polyvinyl acetate emulsion paint, TiO₂ white paste, Messrs. Eklatin, Solothurn). A very uniform colouration with good fine-distribution of the pigment is achieved. Application can be by means of a film drawing instrument, brush or lambswool roller.

The preparations according to Examples 2(a), 2(b), 2(c), 2(d), 3(a), 4, 5, 6 and 7 are equally suitable for pigmenting emulsion paints.

Instead of employing the preparations in the dry form, it is possible to use them in the form of an aqueous paste according to the above process.

If the preparations are frozen to −14° C. before the spray drying and again thawed, the pastes which have been frozen and again thawed show the same dispersion stability and fine-distribution of the pigment as the unfrozen pastes and yield paints of equal quality to the latter when used for colouring aqueous polyvinyl acetate emulsion paint.

Example 10 (bulk dyeing of paper)

A paper of the following quality is manufactured: 100 parts of bleached sulphite cellulose, 40° SR, 10 parts of kaolin, 0.5 part of the preparation according to Example 2(c), 2.0 parts of resin glue and 4.0 parts of aluminium sulphate.

The paper is homogeneously coloured and shows good fine-distribution of the pigment.

Instead of the preparation according to Example 2(c), the preparations according to Examples 2(d), 4 and 5 can be used with equal success.

Example 11 (pigment print)

(a) A printing paste of the following composition is manufactured: 20 parts of the preparation according to Example 2(c), 960 parts of oremasine binder thickener PLT, 15% strength, consisting of 150 parts of oremasine binder PLT (CIBA), 320 parts of water and 530 parts of white spirit, and 20 parts of ammonium nitrate/water, 1:1. It is applied as a film print onto mercerised cotton, with 4 minutes fixing at 150° C.

(b) 1 part of printing paste according to paragraph (a) is diluted with 9 parts of extender paste consisting of 50 parts of oremasine binder PLT (CIBA), 10 parts of oremasine emulsifier P (CIBA), 240 parts of water, 680 parts of white spirit and 20 parts of ammonium nitrate/ water, 1/1. Application as a film print onto mercerised cotton with 4 minutes fixing at 150° C.

Instead of the preparation according to Example 2(c) the preparation according to Example 2(d) can be used with equally good success.

I claim:

1. A dry powdered preparation containing at least one water-insoluble pigment or at least one water-insoluble optical brightener and at least one water-soluble polyhydroxylated organic compound esterified with at least one polybasic inorganic acid, said polyhydroxylated organic compound being selected from the group consisting of cellulose, starch, glucose, fructose, lactose, maltose, cellobiose, sucrose, polyalcohols containing at least 6 hydroxyl groups, and polyvinyl alcohol, said polybasic inorganic acid is selected from the group consisting of sulfuric acid, phosphoric acid and sulfurous acid, and said polyhydroxylated organic ester being present in the range of 0.4 to 1.5 parts, on the basis of an esterification value of 1, per 1.0 part of pigment or optical brightener.

2. A dry preparation according to claim 1 containing at least one water-insoluble pigment or at least one water-insoluble optical brightener and a cellulose polybasic inorganic acid ester, within the range of 0.4 to 1.5 parts, on the basis of an esterification value of 1, of said cellulose per 1.0 part of pigment or optical brightener, said polybasic inorganic acid ester being selected from the group consisting of sulfuric acid, phosphoric acid and sulfurous acid.

3. A dry preparation according to claim 2 wherein the polybasic inorganic acid is sulfuric acid.

4. A dry preparation according to claim 2 containing at least one pigment.

5. A process for the manufacture of dry preparations, wherein at least one water-insoluble pigment or at least one water-insoluble optical brightener is mixed with at least one water-soluble polyhydroxylated organic compound which is esterified with at least one polybasic inorganic acid, said polyhydroxylated organic compound being selected from the group consisting of cellulose, starch, glucose, fructose, lactose, maltose, cellobiose, sucrose, polyalcohols containing at least 6 hydroxyl groups, and polyvinyl alcohols, said polybasic inorganic acid is selected from the group consisting of sulfuric acid, phosphoric acid and sulfurous acid, and said polyhydroxylated organic compound being present in the range of 0.4 to 1.5 parts, on the basis of an esterification value of 1, per 1.0 part of pigment or optical brightener.

6. A process for the manufacture of prepartions according to claim 5 wherein at least one pigment is used.

7. A process as claimed in claim 6, wherein the pigment is ground with the ester.

8. A process as claimed in claim 6, wherein the pigment is kneaded with the ester.

References Cited

UNITED STATES PATENTS

| | | | |
|---|---|---|---|
| 2,109,592 | 3/1938 | Macht et al. | 106—193 I |
| 2,649,382 | 8/1953 | Vesce | 106—193 I |
| 2,690,398 | 9/1954 | Guertler et al. | 106—165 |
| 2,776,912 | 1/1957 | Gregory | 260—215 |
| 3,156,574 | 11/1964 | Gomm et al. | 106—165 |
| 3,249,450 | 5/1966 | Kumins et al. | 106—165 |

ALLAN LIBERMAN, Primary Examiner

U.S. Cl. X.R.

106—193 J, 193 P, 214, 217, 308 B, 308 C, 308 M, 308 Q; 260—41 R, 41 B, 41 C